July 25, 1950
L. A. MAJNERI
2,516,229
NONACCUMULATING PRESSURE CONTROL
UNIT FOR BRAKE SYSTEMS
Filed Sept. 9, 1946
3 Sheets-Sheet 1
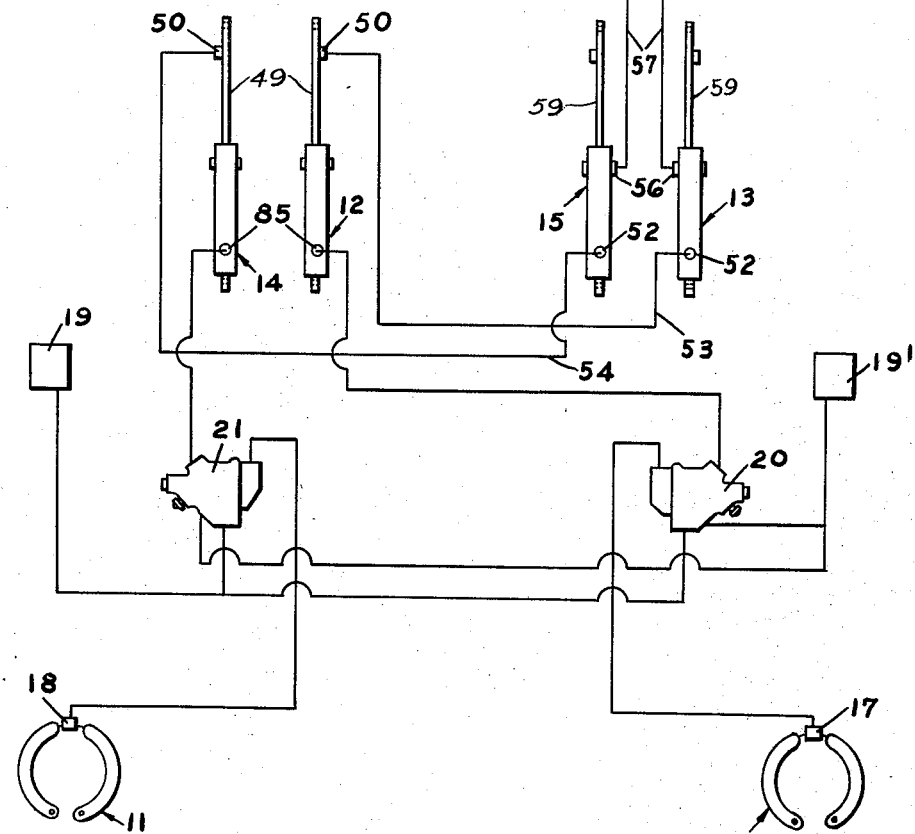
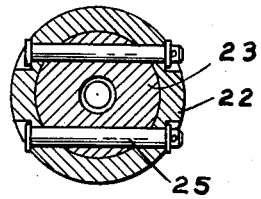
INVENTOR.
LUDWIG A. MAJNERI
BY
Whittemore Hulbert & Belknap
ATTORNEYS

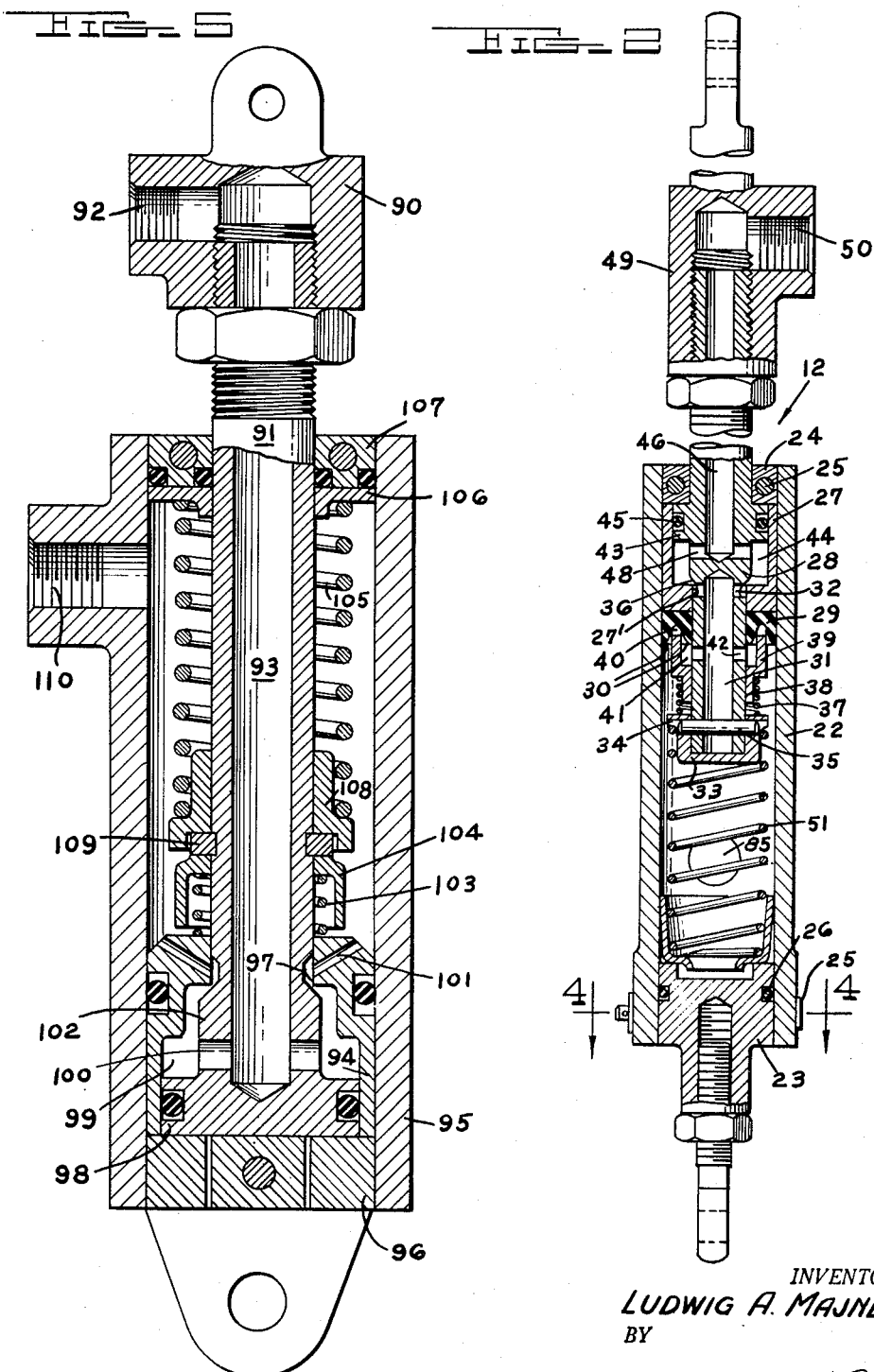

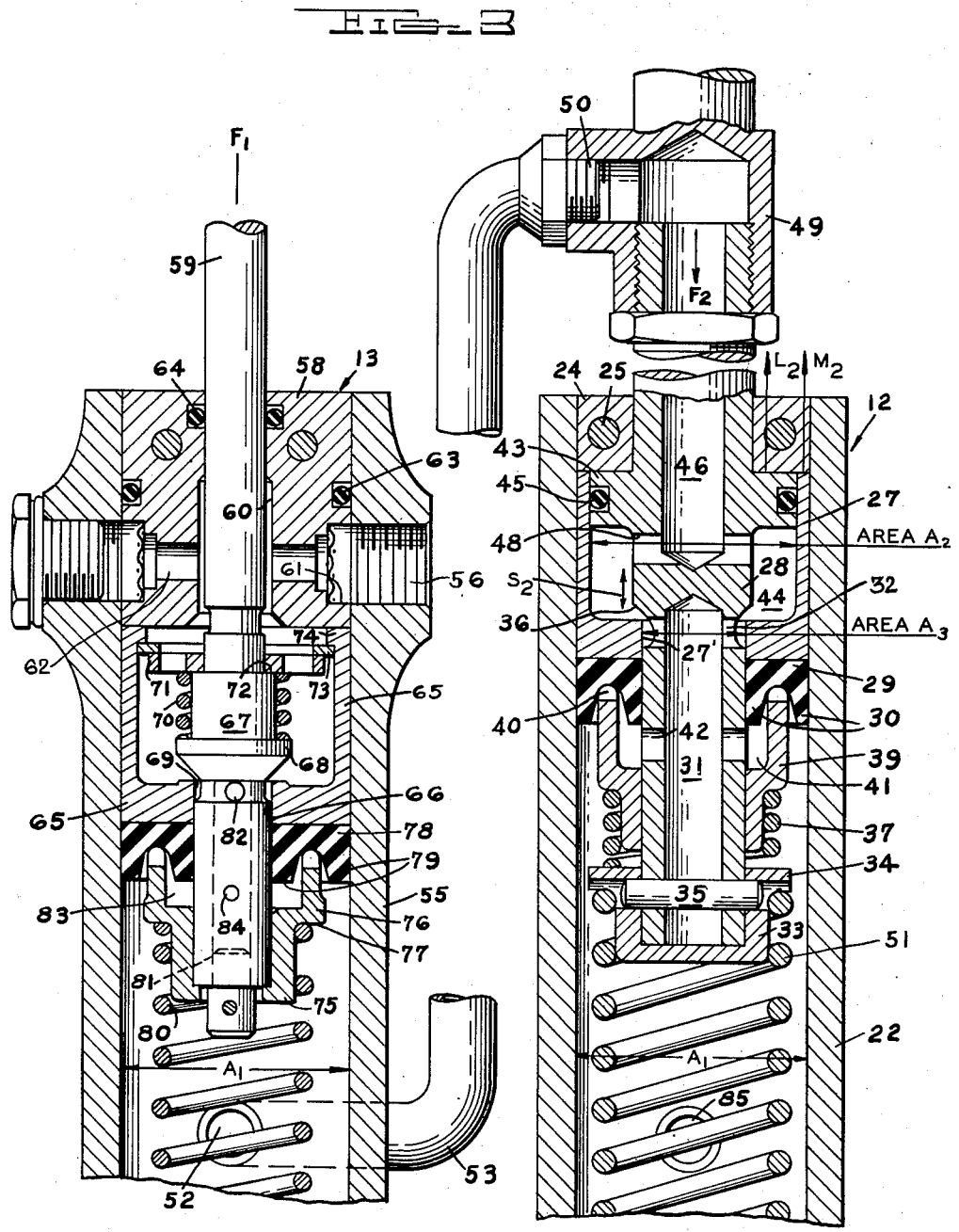

Patented July 25, 1950

2,516,229

UNITED STATES PATENT OFFICE 2,516,229

NONACCUMULATING PRESSURE CONTROL UNIT FOR BRAKE SYSTEMS

Ludwig A. Majneri, Grosse Pointe, Mich., assignor to The Warner Aircraft Corporation, Detroit, Mich., a corporation of Michigan Application September 9, 1946, Serial No. 695,695

4 Claims. (Cl. 60—54.5)

This invention relates to hydraulic brake systems of the type frequently used on aircraft equipped with dual controls enabling the brakes to be independently operated by the pilot and co-pilot of the aircraft.

One type of brake system suitable for installation on aircraft equipped with dual controls comprises pressure producing control devices in the form of master cylinders serially arranged between a reservoir for hydraulic fluid medium and each brake actuator or power brake valve, depending upon the size of the aircraft. More particularly such braking systems usually embody one set of master cylinders for each brake. The intake port of one master cylinder in each set is connected to the reservoir and the discharge port is connected to the intake port of the other master cylinder in the same set so that pressure resulting from manual application of the first master cylinders is transmitted to the second master cylinders. The latter master cylinders are each provided with delivery ports respectively connected directly to the brakes or indirectly to the brakes through suitable power brake valves.

It follows from the above that if for any reason the pilot and co-pilot should simultaneously apply an operating force on their respective control devices or master cylinders the pressure supplied to the brakes will be substantially the sum of the forces applied to the control devices or, in other words, may range from double to four times the normal operating pressure. Such high brake applying pressures may cause locking of the wheels during landing of the aircraft or may result in failure of the brakes.

With the above in view, it is one of the objects of this invention to overcome the above objection by providing an arrangement wherein the maximum pressures obtainable in the braking system does not appreciably exceed specified normal operating pressures regardless of whether the control devices in each set are inadvertently operated simultaneously by the pilot and co-pilot. In other words, even though the control devices of each set are serially arranged between the reservoir and brake actuator, the combined action of these units is not accumulative insofar as the pressure at the brake actuator is concerned.

Another object of this invention is to provide a hydraulic brake system of the above general type wherein the actual brake pressure is determined by the control device subjected to the greatest manual operating force in instances where both devices of a set are operated simultaneously.

Still another object of this invention is to provide an arrangement wherein one control device of each set resists manual operation in instances where a force is applied simultaneously to the other control device of the same set and the resistance serves as a warning to the operator of the said one control device that the other control device is in operation.

The foregoing as well as other objects will be more fully understood as this description proceeds especially when considered in connection with the accompanying drawings wherein:

Figure 1 is a diagram of a hydraulic brake system embodying the features of this invention;

Figure 2 is a longitudinal sectional view through one of the control devices shown in Figure 1;

Figure 3 is an enlarged sectional view showing one set of control devices in operative relationship;

Figure 4 is a cross-sectional view taken on the line 4—4 of Figure 2; and

Figure 5 is a sectional view showing a modified form of control device.

In Figure 1 of the drawings, a hydraulic brake system is shown comprising two sets of manually operable control devices respectively serving a pair of brakes 10 and 11. The control devices in one set are in the form of master cylinders and are indicated generally by the numerals 12 and 13. The control devices in the other set are also in the form of master cylinders and are designated in the drawings by the reference characters 14 and 15. For the purpose of this description, it will be assumed that the control devices 12 and 14 are grouped in a first position for manual operation from the pilot's station and that the control devices 13 and 15 are grouped in a second position for manual operation by the co-pilot. It will further be assumed that the control devices in the first and second positions are respectively connected to the usual manually operable control elements (not shown) so that the control devices in either set may be simultaneously or independently operated as required.

Referring again to Figure 1 of the drawings, it will be noted that the receiving ends of the control devices in the second position are connected to a reservoir 16 for hydraulic fluid medium and the delivery ends are respectively connected to the receiving ends of the control units in the first position. The discharge ends of the control devices in the first position are respectively connected to brake actuators 17 and 18 for the brakes 10 and 11. In the event the brake system embodies a power circuit including a high pressure accumulator 19 and a reservoir 19', power valves 20 and 21 of any accepted design may be introduced between the control devices in the first position and the respective brake actuators 17 and 18. In any case the control devices in each set are serially connected between the reservoir 16 and brake actuators so that the brakes may be selectively or simultaneously operated from either of the two operating positions described.

As previously stated, the present invention is particularly concerned with avoiding excessive pressure at the brake actuators in the event the master cylinders or control devices at both positions are operated simultaneously. Briefly, this is accomplished by specially constructing the master cylinders 12 and 14 at the first position so that these master cylinders will by-pass fluid under pressure to the brake actuators as long as the force applied to the master cylinders 13 and 15 at the second position exceeds any applying force that may be simultaneously applied to the master cylinders 12 and 14. In the event, however, an applying force is exerted on the master cylinders 12 and 14 which exceeds the applying force on the master cylinders 13 and 15, the former master cylinders will render the latter inoperative insofar as effecting the pressure at the actuators is concerned and will control brake application independently of any applying force exerted on the master cylinders 13 and 15. Actually the construction of the master cylinders 12 and 14 is such that the higher of the brake applying forces exerted simultaneously at both positions determines the pressure at the brake actuators.

With the above in view, reference is now made more in detail to the specific construction of the master cylinders 12 and 14. Both of these master cylinders are identical in construction and, accordingly, a description of one will suffice for the both. Upon reference to Figures 2 and 3, it will be noted that the numeral 22 indicates a cylinder closed at the bottom by a plug 23 and closed at the top by a similar plug 24. The two plugs are secured in place by fastener elements 25 and an O-ring seal 26 is provided on the plug 23 to prevent the escape of fluid in the cylinder past the plug.

A cup-shaped piston 27 is slidably supported in the cylinder 22 and a valve member 28 extends through an opening or passage 27' in the base of the piston. A ring 29 of resilient material having concentric annular lips 30 is secured to the bottom of the piston with the inner lip engaging the valve member and with the outer lip engaging the inner wall of the cylinder. The construction is such as to prevent leakage of fluid past the piston and valve member. The lower end portion of the valve member is bored to form an axial passage 31 having radially outwardly extending ports 32 positioned to connect the upper end of the passage 31 with the interior of the piston 27. The lower end of the passage 31 is closed by a cap 33 having an annular enlargement 34 at the upper end and secured to the valve member 28 by a transverse pin 35.

An annular valve seat 36 is formed on the valve member 28 above the ports 32 and is adapted to seat on the bottom wall of the piston around the passage 27' therethrough to prevent the flow of fluid within the cup-shaped piston 27 through the ports 32 and into the passage 31. The valve member 28 is normally urged in a direction to close the passage 27' through the piston by a relatively weak coil spring 37 surrounding the valve member and having the lower end engaging the enlargement 34 on the cap 33. The upper end of the coil spring 37 abuts an annular shoulder formed on a sleeve 38 by an enlargement 39. The upper or free end of the enlargement 39 engages the resilient ring 29 between the lips 30 and portions thereof are cut away to provide passages 40 through which fluid admitted to the annular space 41 formed by the enlargement 39 may escape into the cylinder below the piston. Fluid is permitted to pass into the space 41 from the passage 31 through ports 42 formed in the valve member 28 below the ports 32.

The valve member 28 has an enlargement 43 positioned within the piston for sliding contact with the inner walls of the latter to form a chamber 44 with the base of the piston and having an annular groove intermediate the ends thereof for receiving an O-ring 45. The O-ring 45 frictionally engages the inner wall of the piston and prevents the escape of fluid in the chamber 44 past the enlargement 43. Fluid is admitted into the chamber 44 through an axial passage 46 formed in the valve member 28 in alignment with the passage 31 and connected to the chamber 44 by radially extending ports 48. A manually operable plunger 49 is removably secured to the upper end of the valve member 28 and is formed with an intake port 50 for supplying hydraulic fluid medium to the passage 46.

A coil spring 51 substantially stronger than the coil spring 37 is housed in the cylinder 22 below the piston with the upper end abutting the shoulder or enlargement 34 on the cap 33 with the lower end seated on the plug 23. Thus, the coil spring 51 normally maintains the upper end of the piston 27 and enlargement 43 on the valve member 28 in abutting engagement with the plug 24. As shown in Figure 2 of the drawings, when the parts are in the above position, the passage 27' through the piston is open enabling hydraulic fluid medium to be by-passed through the piston 27 from the passage 46.

Fluid under pressure is introduced into the passage 46 through the intake port 50 and the latter has a fluid connection with one of the master cylinders 13 or 15. As shown in Figure 1 of the drawings, the intake port 50 of the master cylinder 12 is connected to the discharge port 52 of the master cylinder 13 by a conduit 53 to form one set of serially connected control devices between the reservoir 16 and brake actuator 17. The other master cylinder 14 has the intake port 50 connected to the discharge port 52 of the master cylinder 15 by a conduit 54 to provide a set of serially connected control devices between the reservoir 16 and the brake actuator 18.

The master cylinders 13 and 15 at the second position are identical in construction and may be the same as the master cylinders 12 and 14 at the first position, if desired. However, in the interests of economy, it is preferred to employ master cylinders of orthodox construction at the second position. One type of conventional type master cylinder is shown at the left in Figure 3 of the drawings and a description of this device will suffice for both the master cylinders 13 and 15. In detail, the numeral 55 indicates a cylinder having an intake port 56 spaced above the discharge port 52 and connected to the fluid reservoir 16 by a conduit 57. The bottom of the cylinder is closed by a plug (not shown) and the upper end of the cylinder is closed by a plug 58 centrally bored to receive the manually operable plunger 59. The bore through the plug 58 is enlarged to form a passage 60 around the plunger and an annular groove 61 is formed in the outer surface of the plug 58 in registration with the intake port 56 to receive fluid from the latter. The annular groove is connected to the passage 60 by a plurality of passages 62 extending radially from the passage 60 to the annular groove 61. An O-ring 63 is retained in a groove formed in the outer surface of the plug 58 beyond the port 56 and engages the inner wall of the cylinder to prevent the escape of fluid past the plug 58. A second O-ring 64 is retained in a groove formed in the inner surface of the plug 58 beyond the upper end of the passage 60 and frictionally engages the plunger 59 to prevent the escape of fluid from the passage 60 along the plunger 59.

A cup-shaped piston 65 is slidably supported in the cylinder 55 between the plug 58 and discharge port 52. The base of the piston has a central passage 66 therethrough for slidably receiving a valve member 67 forming an extension of the plunger 59. An enlargement 68 is formed on the valve member and occupies a position above the base of the cup-shaped piston 65. The enlargement 68 is formed with a conical surface engageable with a valve seat 69 surrounding the passage 66 through the piston 65 and normally urged into engagement with the seat 69 by a coil spring 70 surrounding the valve member 67 above the enlargement. The bottom of the coil spring 70 rests on the enlargement 68 and the upper end engages an apertured plate 71. The plate is seated on an annular shoulder 72 formed on the valve member 67 and is held in place by a spring clip 73. The clip 73 is secured in the upper end of the piston 65 against an annular flange 74 extending inwardly from the top of the piston.

A cap 75 is secured on the lower end of the valve member 67 below the piston 65 and is formed with an annular enlargement 76 at the upper end providing an annular shoulder 77. The top edge of the enlargement 76 engages a resilient washer 78 fixed to the base of the piston 65 and having concentric lips 79. The outer lip frictionally engages the inner wall of the cylinder 55 and the inner lip frictionally engages the valve member. Thus, fluid leakage past the piston and valve member is avoided. A coil spring 80 of greater strength than the spring 70 acts on the shoulder 77 to urge the piston 65 in its uppermost position against the plug 58.

In the open position of the valve member 67, fluid is by-passed through the valve member by a passage 81 formed in the lower end of the valve member and connected to the passage 66 through the piston 65 by a port 82. The passage 81 is also connected to the space 83 formed by the annular enlargement 76 on the cap 75 by a port 84. The top edge of the annular enlargement 76 is cut away to enable fluid to flow from the space 83 to the discharge port 52 in the cylinder 55.

Operation

Assuming that it is desired to apply both brakes 10 and 11 from position two, the operator at this position merely depresses the plungers 59 of both master cylinders 13 and 15. In so doing the valve members 67 are moved relative to the pistons 65 to close the passages 66 therethrough and the pistons 65 are moved downwardly to displace fluid in the cylinders 55 below the pistons 65 through the discharge ports 52. It will be understood that the entire system is filled with fluid so that the fluid in the conduits 53 is displaced through the ports 50 in the master cylinders 12 and 14. Since the passages 27' through the pistons 27 in both the master cylinders 12 and 14 are open, it follows that fluid is by-passed through the pistons 27 to the portions of the cylinders 22 below the pistons 27 where it flows through the delivery ports 85 to the power valves 20 and 21. The power valves are operated in the usual manner to admit fluid under pressure from the accumulator 19 to the brake actuators 17 and 18. It will, of course, be understood that the master cylinders 13 and 15 may be selectively operated in cases where it is desired to apply only one of the brakes.

When the operator at the second position releases both master cylinders 13 and 15, the springs 80 return the pistons 65 to their uppermost positions against the stop or plug 58 and in so doing also moves the valve members 67 upwardly to open the passages 66 through the pistons 65. As a result, fluid from the reservoir 16 may flow through the pistons 65 to replenish the supply in the system.

Assuming now that it is desired to apply both brakes from the first position, the operator at this position merely depresses the plungers 49 of both master cylinders 12 and 14. Initial downward movement of the plungers 49 closes the passages 27' through the pistons 27 and continued downward movement thereof effects a corresponding movement of the pistons 27 to displace fluid through the delivery ports 85 to the power valves 20 and 21. The power valves are operated in the usual manner by the fluid under pressure to connect the brake actuators to the accumulator 19. When the operator releases the plungers 49, the pistons 27 are returned by the springs 51 to their uppermost positions against the stop or plug 24. Inasmuch as the return springs 51 are stronger than the valve springs 37 it follows that the valve members 28 are also moved upwardly to open the passages 27' through the pistons 27. Since the passages 66 through the pistons 65 of the master cylinders 13 and 15 are also open, it follows that fluid is free to flow from the reservoir 16 through the master cylinders 13 and 15 to the master cylinders 12 and 14 below the pistons 27 to replenish the fluid in the system.

When the master cylinders 12 and 14 are in their released positions, and an applying force $F_1$ is exerted on the actuating plungers 59 of the master cylinders 13 and 15, a line pressure is created that may be expressed by the equation $P_1 = F_1/A_1$ where $P_1$ is the line or brake pressure and $A_1$ is the piston area. In this connection it is pointed out that in the interests of simplicity the force required to compress the return spring is ignored in the above equation as well as in the following computations. The line pressure $P_1$ passes through the master cylinders 12 and 14 to the brake power valves 20 and 21 to operate the brakes. This pressure $P_1$ exerts an upward force on the piston actuating plungers 49 of the master cylinders 12 and 14, which may be expressed by the equation $L_2 = P_1 \times A_2$. In this equation, $P_1$ is the line pressure, $A_2$ is the area of the enlargement exposed to the line pressure $P_1$, and $L_2$ is the force applied against the area $A_2$ of the enlargement. The pressure $P_1$ also exerts an upward force on the pistons 27 of the master cylinders 12 and 14 which may be expressed as $M_2 = P_1 \times (A_1 - A_2)$ wherein $A_2$ is the area of the piston and $M_2$ is the force applied against this area by the line pressure $P_1$. From the above equations it can be seen that the sum of the forces $(L_2+M_2)=P_1/A_1$ and, therefore, equals the force $F_1$. These upwardly acting forces will, of course, oppose any attempt to apply the master cylinders 12 and 14 by the operator so that the latter is warned that the master cylinders 13 and 15 are operative.

Assuming now that the force $F_1$ applied to the master cylinders at positions two is held constant and that a gradually increasing force $F_2$ is applied to the actuating plungers 49 of the cylinders 12 and 14, it will be noted that the plungers 49 will not start their downward travel as long as the force $F_2$ is less than the force $L_2$. When the applying force $F_2$ exceeds the force $L_2$ but remains less than the force $(L_2-M_2)$ the valve members 28 will close the passages 27' through the pistons 27. The pistons 27 remain in their inoperative or uppermost positions, however, until the applying force $F_2$ exceeds the applying force $F_1$. It will be noted from the above that as long as the applying force $F_2$ is lower than the applying force $F_1$, the pressure supplied to the brake remains $P_1$ p. s. i. or, in other words, remains under the control of the master cylinders 13 and 15. During such a condition the force $F_2$ merely acts to relieve the thrusts $L_2$ and $M_2$ from being exerted against the plugs 24.

As the applying force $F_2$ becomes greater than the applying force $F_1$ the pistons 27 move downwardly in their respective cylinders 22 and a line pressure $P_2$ is obtained which exceeds the line pressure $P_1$. The applying pressure $P_1$ is confined in the chambers 44 between the enlargements 43 on the valve members 28 and the base portions of the pistons 27. Thus, the applying pressure $P_1$ tends to force the plungers 49 upwardly and the pistons 27 downwardly with a force equivalent to $(A_2-A_3) \times P_1$ wherein $A_3$ is the area of the opening 27' in each piston. This latter force tends to open the passages 27' through the pistons 27. However, it will be noted from Figure 3 of the drawings that the force tending to close the passages 27' through the pistons 27 by the valve members 28 is equal to $P_2 \times (A_1-A_3)$. With the applying force $F_2$ greater than the applying force $F_1$, the line pressure $P_2$ is larger than the pressure $P_1$ and, due to the construction of the control devices, $(A_1-A_3)$ is larger than $(A_2-A_3)$. It is evident, therefore, that the valve remains closed and that the seating force $S_2$ transmitted through the valve seat is $$S_2 = P_2(A_1-A_3) - P_1(A_2-A_3)$$

Since the pressure $P_1$ is confined to the chambers 44, the pressure $P_2$ supplied to the brakes is $P_2=F_2/A_1$, which is the same as if the pressure $P_1$ were not applied. It follows from the foregoing that if both sets of master cylinders are simultaneously applied, the greater of the two brake applying forces determines the actual brake pressure independently of the other or lesser applying force.

Let it now be assumed that the applying force $F_2$ is held constant and the applying force $F_1$ is gradually increased. Before the applying force $F_1$ could become sufficient to over-ride the force $F_2$ the force $P_2 \times (A_1-A_3)$ would have to equal the force $P_1 \times (A_2-A_3)$. In other words, the force $F_1$ would have to become $$F_1 = F_2(A_1-A_3)/(A_2-A_3)$$

before it could over-ride the effect of force $F_2$. Since it requires this increase by area ratio of force $F_1$ to overcome the force $F_2$ it is advisable to locate the master cylinders 12 and 14 at the pilot's station to make it more difficult for the co-pilot to over-ride the pilot.

The embodiment of the invention shown in Figure 5 of the drawings differs from the construction shown in Figure 2 of the drawings in that displacement is effected by pulling the actuating plunger 90 instead of pushing the latter. The plunger 90 is secured to the upper end of the valve member 91 and is formed with an intake port 92 which communicates with the upper end of a passage 93 in the valve member.

An inverted cup-shaped piston 94 is slidably supported in the cylinder 95 and normally engages a plug 96 forming a closure for the bottom of the cylinder. The base of the piston is centrally apertured to provide a passage 97 for freely receiving the valve member 91 and the latter is formed with a head 98 at the lower end. The head 98 is slidably supported in the piston and cooperates with the base of the latter to provide a chamber 99 which communicates with the passage 93 through ports 100. The chamber 99 is adapted to communicate with the cylinder above the piston through ports 101 which extend from the passage 97 intermediate the ends thereof and are adapted to be closed by a portion 102 on the valve member when the latter is moved to its uppermost position relative to the piston. The portion 102 is urged into engagement with the base of the piston to close the ports 101 by a coil spring 103 surrounding the valve member and located in a retainer 104 fixed to the valve member above the piston 94. The upper end of the spring 103 engages the base of the retainer and the lower end of the spring projects through the open end of the retainer into abutting engagement with the base of the piston.

The piston 94 is yieldably urged into engagement with the plug 96 by a relatively stronger coil spring 105 surrounding the valve member 91 above the retainer 104. The upper end of the spring 105 engages a plate 106 centrally apertured to slidably receive the valve member and adapted to abut the plug 107 at the top of the cylinder. The lower end of the spring 105 engages a shoulder formed on a sleeve 108 which is slidably mounted on the valve member in a position to engage a spring washer 109. The washer 109 is fixed to the valve member and acts as a stop for both the retainer 104 and sleeve 108.

The above construction is such that initial upward movement of the plunger 90 moves the valve member 91 relative to the piston 94 sufficiently to close the passage 97 or ports 101 and continued movement of the plunger effects a corresponding upward movement of the piston to displace fluid from the cylinder above the piston through the delivery port 110. With the exception of the fact that the operating plunger 90 is pulled instead of pushed, the unit operates in the same manner as the unit featured in Figure 2 of the drawings.

What I claim as my invention is:

1. A fluid pressure operated brake system comprising a brake actuator, a first manually operable pressure producing device of the displacement type having a discharge port, a second manually operable pressure producing device comprising a cylinder having spaced intake and delivery ports respectively connected to the discharge port of the first device and to the brake actuator, a piston slidable in the cylinder between the ports therein and having a passage therethrough; a valve member supported for sliding movement relative to the piston and having a portion adapted to close the passage through the piston, manually operable means for moving the valve member in a direction to successively close the passage and move the piston in a direction toward the delivery port in the cylinder, an enlargement movable with the valve member between intake port and piston and cooperating with the latter to form a chamber communicating with the intake port to receive fluid from the first device, the surface of the enlargement and the surface of the piston subjected to the pressure of the fluid supplied to the chamber by the first device having corresponding areas, and a slidable seal at the enlargement preventing the escape of fluid from the chamber past the enlargement.

2. A fluid pressure operated brake system comprising a brake actuator, a first manually operable pressure producing device of the displacement type having a discharge port, a second manually operable pressure producing device comprising a cylinder having spaced intake and delivery ports respectively connected to the discharge port of the first device and to the brake actuator, a piston slidable in the cylinder between the ports therein and having a passage therethrough; a valve member supported for sliding movement relative to the piston and having a portion adapted to close the passage through the piston, manually operable means for moving the valve member in a direction to successively close the passage and move the piston in a direction toward the delivery port in the cylinder, an enlargement movable with the valve member between intake port and piston and cooperating with the latter to form a chamber communicating with the intake port to receive fluid from the first device, the surface of the enlargement and the surface of the piston subjected to the pressure of the fluid supplied to the chamber by the first device having corresponding areas, a slidable seal at the enlargement preventing the escape of fluid from the chamber past the enlargement, spring means normally urging the valve mmber to its open position, a stop engageable with the enlargement to limit opening movement of the valve member by the spring, the area of the enlargement forming one wall of the chamber and the area of the portion of the piston forming the opposite wall of the chamber being substantially the same whereby the pressure supplied to said chamber by the first device is neutralized in the closed position of the valve member.

3. A fluid pressure operated brake system comprising a brake actuator, a first manually operable pressure producing device of the displacement type having a discharge port, a second manually operable pressure producing device comprising a cylinder having a stop at one end and having a delivery port adjacent the opposite end connected to the brake actuator, a piston slidably supported in the cylinder between the stop and delivery port, a valve member controlling a passage through the piston, an enlargement on the valve member normally held against the stop and cooperating with the adjacent side of the piston to form a chamber, a slidable seal at the enlargement preventing the escape of fluid from the chamber past the enlargement, a fluid connection between said chamber and the first pressure producing device, and manually operable means for successively moving the valve member to close the passage through the piston and to move the piston in a direction to displace fluid through the delivery port to said actuator.

4. A fluid pressure operated brake system comprising a brake actuator, a first manually operable pressure producing device of the displacement type having a discharge port, a second manually operable pressure producing device comprising a cylinder having a stop at one end and having a delivery port adjacent the opposite end connected to the brake actuator, a recessed piston slidably supported in the cylinder between the stop and delivery port with the recess opening toward the stop, a passage through the piston, a valve member controlling a passage through the piston and having limited movement relative to said piston, an enlargement on the valve member slidable in the piston recess and cooperating with the base of the recess to form a chamber, a seal on the enlargement slidably engaging the side wall of the recess to prevent leakage of fluid past the enlargement, a fluid connection between the chamber and discharge port of the first pressure producing device, and manually operable means connected to the valve member for moving the valve member relative to the piston to close the passage through the piston and for subsequently moving the piston to displace fluid in the cylinder through the delivery passage to the brake actuator.

LUDWIG A. MAJNERI.

REFERENCES CITED

The following references are of record in the file of this patent:

UNITED STATES PATENTS

| Number | Name | Date |
|---|---|---|
| 2,024,549 | Tarris | Dec. 17, 1935 |
| 2,071,059 | Bowen | Feb. 16, 1937 |
| 2,213,947 | Bowen | Sept. 10, 1940 |
| 2,254,890 | Gardiner | Sept. 2, 1941 |

FOREIGN PATENTS

| Number | Country | Date |
|---|---|---|
| 749,480 | France | May 8, 1933 |